Patented May 30, 1933

1,912,200

UNITED STATES PATENT OFFICE

HORACE H. HOPKINS, OF RIDLEY PARK, PENNSYLVANIA, ASSIGNOR TO E. I. DU PONT DE NEMOURS & COMPANY, OF WILMINGTON, DELAWARE, A CORPORATION OF DELAWARE

FLOOR COVERING AND PROCESS OF MAKING SAME

No Drawing.   Application filed November 15, 1928. Serial No. 319,741.

This invention relates to floor coverings and to processes of making them, and is particularly directed toward the manufacture of an improved inlaid, molded, or battle-ship type of linoleum.

In the past, there have been two general classes of floor coverings known to the art. One class consists of the so-called felt base coverings, and the other consists of the linoxyn base linoleums.

The felt base coverings are relatively cheap and non-durable, comprising a felt fabric saturated with an asphaltic cement and printed in various patterns with linseed oil paints.

The other type is, in general, prepared by impregnating a burlap backing with a cement or binder comprising a mixture of linoxyn, rosin, and other gums with wood flour, ground cork, pigments, and inerts. This cement is calendered upon the burlap backing and various designs are either printed or laid upon the base thus prepared. These designs are composed of a substantially similar cement derived from mixtures of linoxyn, resins, wood flour, ground cork, pigments and filler.

The linoxyn cements yield products which have good wearing qualities but which possess two distinct disadvantages. In the first place, the preparation of the cement is a time consuming and expensive operation inasmuch as the manufacture of linoxyn is a tedious process. Furthermore, after the cement is prepared and applied by hand or machine to the burlap backing, a further curing period of six weeks to two months, and sometimes longer, is required to secure a suitable wearing surface. This curing operation involves the installation of very large stoving ovens and necessitates the tie-up of a large amount of capital during the curing process. The second great objection to the present linoxyn type of floor covering is its poor alkali resistance. Ordinary soaps or soap powders rapidly cause a saponification of the oxidized oil which results in a rotting and deterioration of the floor covering.

The present invention eliminates the two difficulties enumerated above by substituting a binder which is quickly prepared by chemical synthesis and which requires a very short curing period. Furthermore, the wearing qualities and alkali resistance of my new product are markedly better than the linoxyn floor coverings. In addition, the products of this invention retain their flexibility for a longer time than the linoxyn type of linoleum, thereby yielding greater durability and freedom from cracking.

I have discovered that the resinous esters of polyhydric alcohols with mixtures of polybasic acids and monobasic acids containing more than ten carbon atoms are ideally adapted to use as binders for floor coverings. For this purpose the resins are combined with wood flour, ground cork, pigments, or other inerts in the manner described below to form a viscous cement which may be applied as the base or top coating for a floor covering in a manner analogous to linoxyn cement.

Illustrative examples embodying the principles of this invention are given below.

Example I 171 parts of glycerin, 490 parts of linseed oil acids derived by saponification of linseed oil, 164 parts of China wood oil acids derived by saponification of China wood oil, and 248 parts of phthalic anhydride are heated together at a temperature of 300° C. for two hours. At the end of this period, the esterification product has become a tough, sticky, resinous mass which can be used as a binder in the preparation of floor covering cement. For example, 40 parts by weight of the esterification product described above are mixed in any suitable mixer, such as a Werner-Pfleiderer mixer, with 47 parts by weight of ground cork, and 13 parts by weight of pigment. This cement is then calendered upon a burlap backing in the usual manner. Inlays may be prepared by mixing the above binder with the usual combinations of pigments, inerts, and fillers, and these may be applied by calendering to the base prepared as described above. The product, after calendering, is stoved at a temperature of 200° F. for 24 to 48 hours.

Example II 36 parts of the plastic polyhydric alcohol-polybasic acid resin described above may be mixed with 40 parts of wood flour, and 24 parts of coloring matter (pigments) and applied as described in Example I.

Although the stoving in the above examples is indicated as being accomplished at a temperature of 200° F., in from 24 to 48 hours, it will be obvious that, where desired, this may be done at a somewhat higher or lower temperature and in such cases, in order to accomplish a similar drying, the duration of the stoving operation will require a correspondingly shorter or longer period. For the purposes of this application the period of stoving at a different temperature from that indicated, which applicant refers to by the expression "an equivalent period", is that period which will produce a corresponding degree of drying at the temperature used although, for practical purposes, this period of curing should not exceed seven (7) days.

While any polyhydric alcohol may be used, I prefer to use glycerin or ethylene glycol. Although any polybasic acid may be used, I prefer phthalic acid or phthalic anhydride because of its availability and low cost. Also, any monobasic acid or acids of the non-volatile type containing more than 10 carbon atoms may be combined in the mixed ester described above. Examples of suitable acids are oleic acid, palmitic acid, stearic acid, ricinoleic acid, or the acids derivable by saponification of linseed oil, China wood oil, or castor oil, or any other drying or non-drying oils, and, by varying the proportion of drying and non-drying oil acids, any desired degree of flexibility or plasticity may be obtained. Linseed or China wood oils may be substituted for part or all of the oil acids, and rosin or other acidic resins may be incorporated as a part of the resin mixture. For convenience I shall refer to these resinous esterification products as modified polyhydric alcohol-polybasic acid resins.

Any of the usual pigments and inerts or fillers may be used in the preparation of my improved cement.

If desired, my improved floor covering may be provided with the usual coating of a cellulose ester in solution.

It will therefore be apparent that I have developed a new and useful type of floor covering and a process of making same and that this floor covering can be manufactured in a much shorter time than previous types of linoleum floor covering and will possess much greater durability and flexibility than either the felt base type of floor covering or the linoleum floor covering which has been available heretofore.

As many apparently widely different embodiments of this invention may be made without departing from the spirit and scope thereof, it is to be understood that I do not limit myself to the specific embodiments thereof except as defined in the appended patent claims.

I claim:

1. A floor covering comprising a mixture of an ester of a polyhydric alcohol, a polybasic acid, and a monobasic acid containing more than 10 carbon atoms, with pigments and inert material, said mixture being free from cellulose derivatives, and said named components constituting substantially the entire mixture.

2. The floor covering of claim 1, in which the ester is formed from glycerin, phthalic anhydride, and linseed and China wood oil acids, and in which the inert material includes ground cork.

3. A floor covering comprising a fibrous backing impregnated with a composition of matter which contains a mixture of an ester of a polyhydric alcohol, a polybasic acid, and a monobasic acid containing more than 10 carbon atoms, with pigments and inert material, said composition of matter being free from cellulose derivatives, and said named components constituting substantially the entire composition of matter.

4. The floor covering of claim 3, in which the ester is a reaction product of glycerin, phthalic anhydride, and linseed and China wood oil acids, and in which the inert material includes ground cork.

5. The floor covering of claim 3, in which the impregnated backing is provided with an inlay which comprises the ester, pigments and inert material.

6. The floor covering of claim 3, in which the backing is burlap.

7. The process of manufacturing a floor covering which comprises impregnating a fibrous backing with a mixture of pigments, inert material and an ester of a polyhydric alcohol, a polybasic acid, and a monobasic acid containing more than 10 carbon atoms, and curing in not to exceed seven days, said mixture being free from cellulose derivatives, and said named components constituting substantially the entire mixture.

8. The process of manufacturing a floor covering which comprises impregnating a fibrous backing with a mixture of pigments, inert material and an ester of a polyhydric alcohol, a polybasic acid, and a monobasic acid containing more than 10 carbon atoms, and curing at a temperature of 200° F. in not to exceed 48 hours or at a different temperature for an equivalent period, said mixture being free from cellulose derivatives, and said named components constituting substantially the entire mixture.

9. The process of claim 7, in which the impregnated fibrous backing is calendered before curing.

10. The process of claim 7, in which the impregnated fibrous backing is coated with an inlay which comprises the ester, pigments, and inert material, and is calendered before curing.

In testimony whereof, I affix my signature.

HORACE H. HOPKINS.